US008482395B2

(12) United States Patent
Rysenga et al.

(10) Patent No.: US 8,482,395 B2
(45) Date of Patent: Jul. 9, 2013

(54) DETECTING A TIRE ROTATION ON A TELEMATICS-EQUIPPED VEHICLE

(75) Inventors: Jeffrey P. Rysenga, Berkley, MI (US); Russ Eling, Windsor (CA)

(73) Assignee: General Motors LLC, Detroit, MI (US)

( * ) Notice: Subject to any disclaimer, the term of this patent is extended or adjusted under 35 U.S.C. 154(b) by 303 days.

(21) Appl. No.: 13/048,543

(22) Filed: Mar. 15, 2011

(65) Prior Publication Data
US 2012/0235807 A1    Sep. 20, 2012

(51) Int. Cl.
*B60C 23/00* (2006.01)
(52) U.S. Cl.
USPC .......... 340/445; 340/442; 73/146.5; 73/146.8
(58) Field of Classification Search
USPC ................. 340/445, 442, 444, 447; 73/146.2, 73/146.5, 146.8
See application file for complete search history.

(56) References Cited

U.S. PATENT DOCUMENTS

| | | | | |
|---|---|---|---|---|
| 6,417,766 B1 * | 7/2002 | Starkey | ......................... | 340/447 |
| 6,788,193 B2 * | 9/2004 | King et al. | .................... | 340/447 |
| 7,148,793 B2 * | 12/2006 | Lin | ................................ | 340/442 |
| 7,414,523 B2 * | 8/2008 | Li et al. | ........................ | 340/447 |
| 7,994,904 B2 * | 8/2011 | Kim | ................................ | 340/442 |

* cited by examiner

*Primary Examiner* — Toan N Pham
(74) *Attorney, Agent, or Firm* — Anthony Luke Simon; Reising Ethington P.C.

(57) ABSTRACT

A system and method for detecting a rotation of the vehicle tires between different wheel locations. The method carried out by the system involves obtaining and storing TPM sensor identification numbers and their corresponding tire locations. Next, the system checks the sensors periodically to determine if any of the sensors have changed tire location. Based on that change, the system determines if a tire rotation has occurred; for example, by matching changes in sensor positions with known tire rotation patterns. This approach allows the system to detect and record a tire rotation, as well as to take some automated action, such as subsequently notifying the vehicle owner when the next scheduled tire rotation is due.

20 Claims, 3 Drawing Sheets

DETECTING A TIRE ROTATION ON A TELEMATICS-EQUIPPED VEHICLE

TECHNICAL FIELD

The present invention relates generally to vehicle tires and, more particularly, to methods for detecting a rotation of the vehicle tires between different wheel positions such as is often done during manufacturer-recommended servicing of the vehicle.

BACKGROUND OF THE INVENTION

A tire rotation involves moving a vehicle's tires from one position on the vehicle to another to help achieve even tire tread wear. Tire tread wear can be uneven for a variety of reasons including vehicle front and rear weight difference, vehicle driving maneuvers, improper wheel alignment, etc. Depending on the vehicle and tire manufacturer specifications, a tire rotation may be recommended every 5,000-10,000 miles. A tire rotation pattern can include moving the back tires to the front and the front tires to the back, but crossing them when moving them to front, back, or both. Tires can be also moved side to side, or only front to back and back to front without any crossing. Other tire rotation patterns are also possible. In addition to providing even tread wear, a tire rotation may avoid an oversteer condition and may help provide a balanced vehicle handling and traction.

In addition, tire pressure monitoring (TPM) systems have been used in a variety of vehicles to monitor and alert a driver when a tire pressure falls below a certain level. TPM systems currently exist that employ pressure sensors that have unique identification numbers and are mounted at each wheel of a vehicle. The vehicle is programmed with the location of each sensor so that, if a sensor reports an under-pressure condition, the vehicle will know and identify which tire needs servicing. In case of a tire rotation, the vehicle is reprogrammed with the sensors' new locations. Depending on the type of TPM system used, reprogramming a vehicle's TPM system can be performed automatically when a vehicle is driven, by manually performing at least some functions such as pushing a reprogramming button inside the vehicle, using the vehicle key fob, or by a service technician at a service station using a special reprogramming tool.

SUMMARY OF THE INVENTION

According to one embodiment of the invention, there is provided a method detecting a vehicle tire rotation using a vehicle system module. The method comprises the steps of: (a) obtaining identification numbers and corresponding tire locations for a plurality of tire pressure monitoring (TPM) sensors attached to tires of a vehicle; (b) storing the identification number and corresponding tire location for each of the TPM sensors; (c) determining a change in the tire locations of at least one of the TPM sensors using at least one vehicle system module located onboard the vehicle; and (d) determining that a tire rotation has occurred based on the change.

According to another embodiment of the invention, there is provided a method of detecting and responding to a vehicle tire rotation using a vehicle telematics unit. The method comprises the steps of: (a) obtaining identification numbers and corresponding tire locations for a plurality of tire pressure monitoring (TPM) sensors installed on a vehicle; (b) storing the identification numbers and their corresponding tire locations; (c) obtaining updated identification numbers and their corresponding tire locations for the TPM sensors following a reprogramming of a TPM system located on the vehicle; (d) comparing the updated and stored locations for the TPM sensors; and (e) if one or more of the TPM sensors has changed tire locations, then: (e1) determining that a tire rotation has occurred based on the change; (e2) recording the tire rotation; and (e3) providing a user of the vehicle with a customized service that is based on the tire rotation. At least one of the foregoing steps is carried out using a vehicle telematics unit.

In accordance with yet another embodiment of the invention, there is provided vehicle that detects tire rotations performed on the vehicle. The vehicle has inflated tires and a tire pressure monitoring (TPM) system that includes a plurality of TPM sensors each of which is located on a different one of the tires. The tires and their associated TPM sensors are each located at one of a number of tire locations around the vehicle. The vehicle is programmed to carry out the following steps: (a) obtaining identification numbers and corresponding tire locations for the TPM sensors; (b) storing the identification number and corresponding tire locations; (c) determining a change in the tire locations of at least one of the TPM sensors; and (d) determining that a tire rotation has occurred based on the change.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below are directed to approaches for detecting a tire rotation. The disclosed methods involve obtaining and storing a vehicle TPM sensor identification (ID) number and its corresponding tire location for each of two or more wheels on the vehicle. Next, the system determines if there is a change in tire location for any of the sensor IDs. If so, then a determination is made as to whether a tire rotation has taken place. If so, the system can then take some action, such as to log the occurrence of the tire rotation, and/or notify the vehicle owner when the next scheduled tire rotation is due.

Communications System

Figure 1:
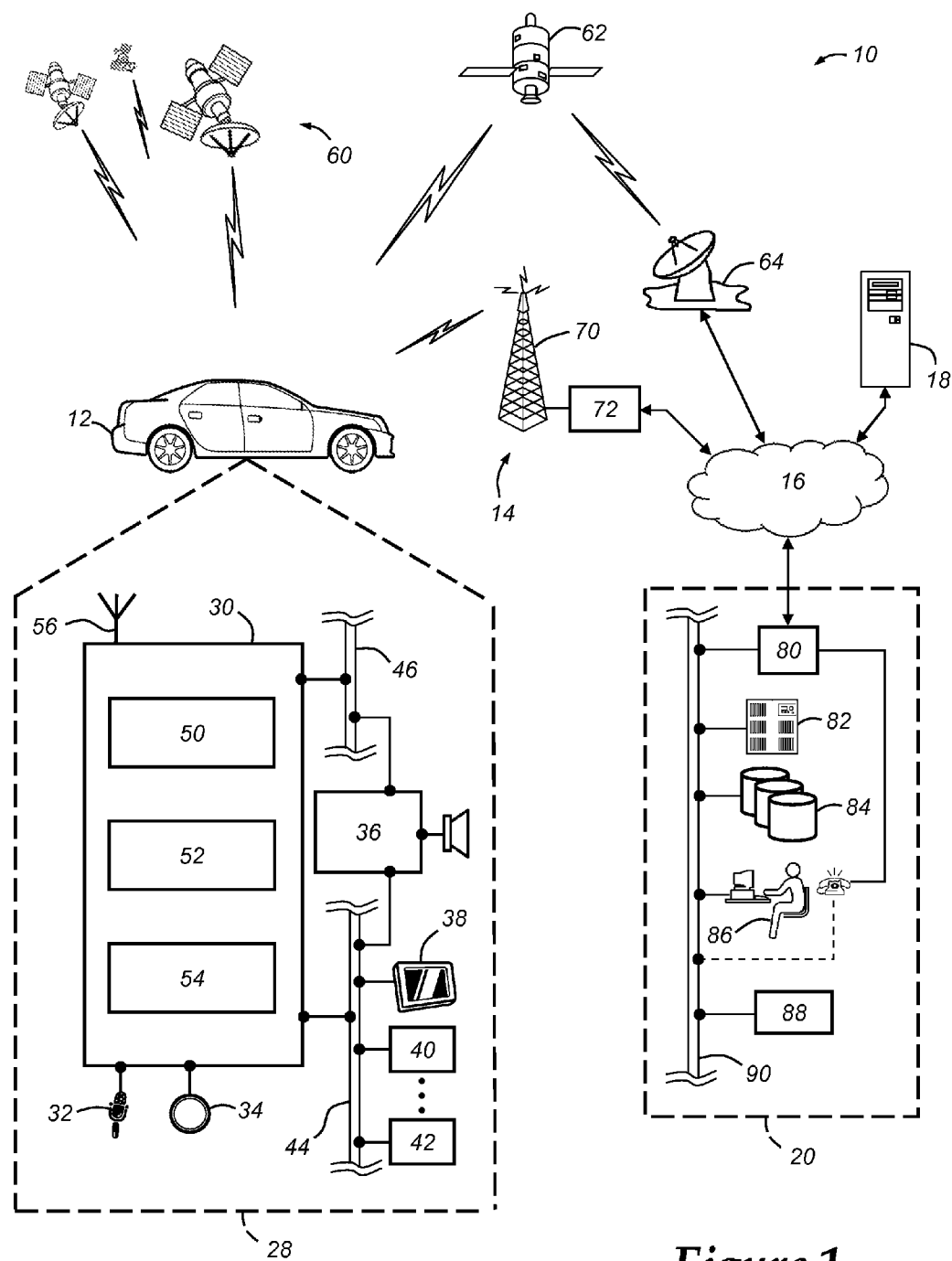
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs)

42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
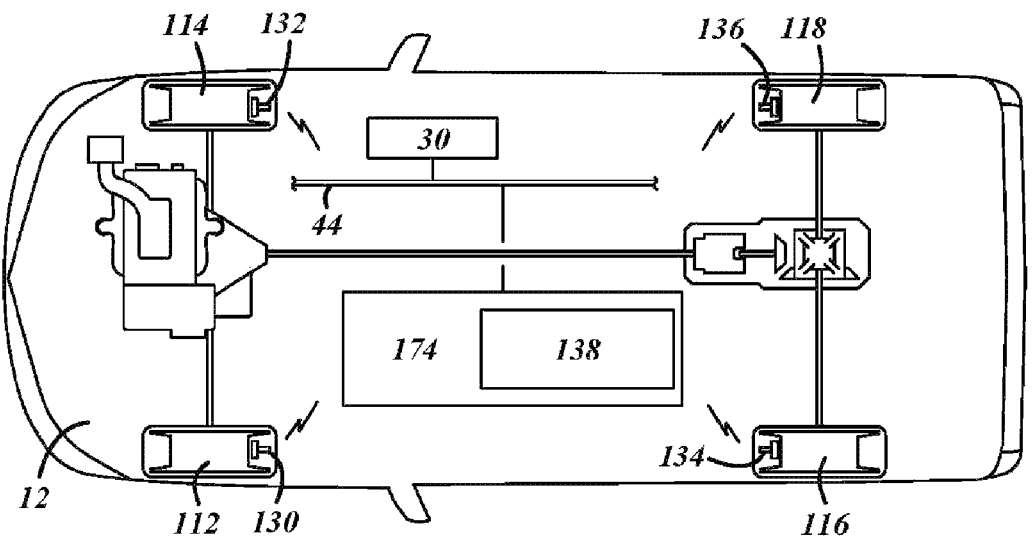
FIG. 2 is a schematic view of an exemplary tire rotation detection system that includes a TPM system that is mounted on a vehicle and includes four sensor units, a wireless module, and a telematics unit.
Figure 3:
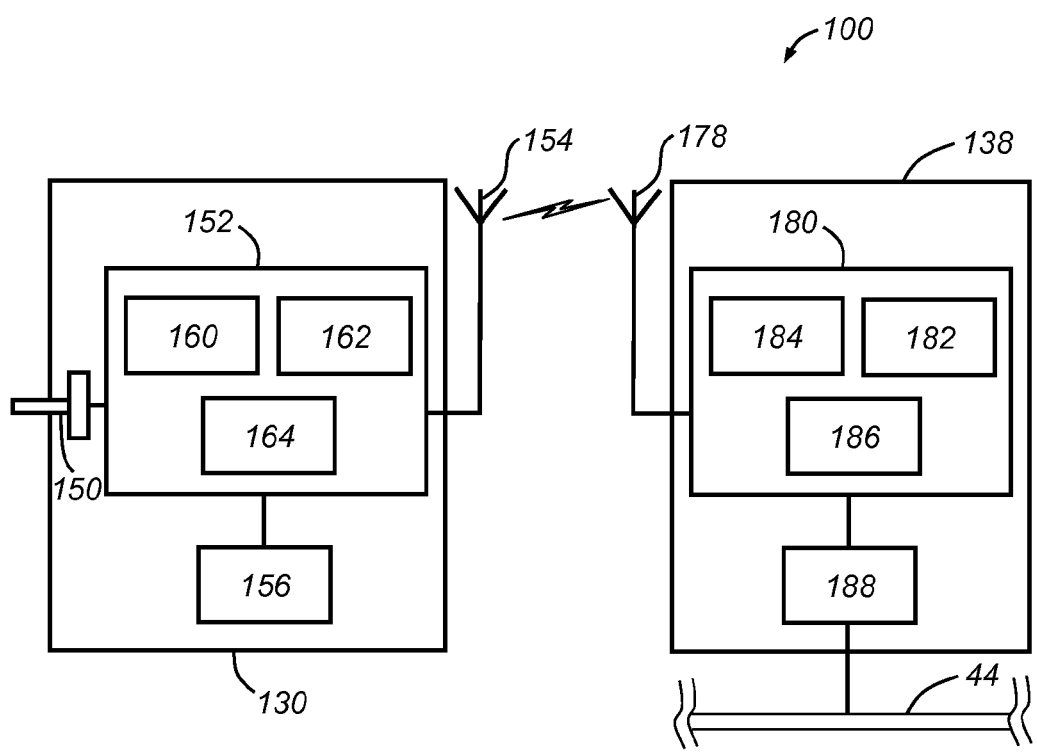
FIG. 3 is a more detailed block diagram of the wireless module and one of the sensor units shown in FIG. 2.

Turning now to FIGS. 2 and 3, there is shown an exemplary tire pressure monitoring (TPM) system 100. Although the following description is in the context of a particular TPM system 100, it should be appreciated that this system is merely exemplary and that other TPM systems known in the art could also be used. According to this embodiment, TPM system 100 includes sensor units 130-136 and a transceiver unit 138.

Sensor units 130-136 are respectively mounted at vehicle wheels 112-118 and are designed to take one or more types of readings, such as tire pressure readings, and wirelessly communicate those readings to transceiver unit 138, which is mounted on the vehicle. In one embodiment, each of the sensor units 130-136 establishes a wireless link with transceiver unit 138 that enables two-way communication between the wheel-mounted sensor unit and the vehicle-mounted transceiver unit. It should be appreciated that it is not necessary to establish a bi-directional wireless link between these components, as some instances may only require a one-way communication link, as is known in the art. Each sensor unit 130-136 may be used to replace a traditional rubber valve stem used on the inflated tires and, in an exemplary embodiment, includes a sensing element 150, sensor circuitry 152, an antenna 154, and a power source 156. It should be appreciated that any number of additional components, devices, circuits, etc. that are known in the art could also be used. The following description is provided in the context of sensor unit 130, but can apply to sensor units 132-136 as well.

Sensing element 150 measures tire pressure and generates readings that can be processed, saved, analyzed and/or transmitted by sensor unit 130. Sensing element 150 may be of the type that is in direct communication with the air inside of the tires (a so-called direct TPM system), or of the type that does not directly sense the air pressure within the tire but instead determines it based on one or more additional parameters, like wheel rotational speed (a so-called indirect TPM system). In the case of a direct TPM system, a variety of suitable mounting configurations could be used. These include mounting sensing element 150 in the end of a valve stem or mounting it in a steel band that extends around the rim of the wheels, to name a few. In one particular embodiment, sensing element 150 may be made in a glass-silicon-glass structure that holds a pressure sensitive membrane with one or more piezo resistive elements buried therein. An absolute pressure reference can be given by a vacuum chamber implemented in the top glass, for example. It should be appreciated that sensing element 150 may also sense temperature, displacement, velocity, acceleration or any other suitable parameter, and is not limited to tire pressure sensing only.

Sensor circuitry 152 receives input from sensing element 150 and may engage in a communication with transceiver unit 138, which is located at vehicle 20. According to the particular embodiment shown here, sensor circuitry 152 is electronically connected to sensing element 150 and antenna 154 and includes a processing unit 160, a wireless unit 162, and memory 164. With these components, sensor circuitry 152 may establish a wireless link with transceiver unit 138 so that a communication can occur between them; as mentioned above.

Processing unit 160 can process information from a number of different sources and preferably includes one or more suitable components, such as a microprocessor, a microcontroller, an application specific integrated circuit (ASIC), or any other suitable device known in the art. Processing unit 160 may be assigned a variety of tasks, including packaging sensor readings from sensing element 150 into a suitable data format that can be provided to wireless unit 162 for subsequent wireless transmission. These are only some of the tasks and functions that processing unit 160 may perform, as skilled artisans will appreciate that it could be used in many other capacities as well.

Wireless unit 162 may perform a number of tasks pertaining to the transmission and/or reception of wireless signals between the wheel-based sensor unit 130 and the vehicle-based transceiver unit 138. For instance, wireless unit 162 may receive a data packet containing sensor readings from processing unit 160, modulate the data packet information onto a particular carrier frequency, up-convert the modulated signal to an appropriate radio frequency, and broadcast the resultant RF signal to transceiver unit 138.

Memory 164 may store various pieces of data, information, wireless settings, software, firmware, etc., and can be accessed by the different components of TPM system 100. In one example, memory 164 stores readings taken by sensing element 150, electronic instructions used to control processing unit 160, etc. These are, of course, only some of the items that could be stored at memory 164, as skilled artisans will know of many other potential uses.

Antenna 154 is electronically coupled to sensor circuitry 152, particularly wireless unit 162, and aids in the transmission and reception of wireless signals. In one exemplary embodiment, antenna 154 is an RF antenna and is integrated into a valve stem that functions as both an air valve for the tire and as an antenna for transmitting and receiving encoded RF information. Depending on where the vehicle is likely to be used, antenna 154 may transmit and receive signals over ultra high frequency (UHF) signals, which are part of the RF range (e.g., 315 MHz in the United States and 433 MHz in Europe). Other embodiments of antenna 154 could also be used.

Power source 156 powers the components of sensor unit 130 and may include any suitable power source known in the art. In an exemplary embodiment, power source 156 includes a non-replaceable battery with an expected lifetime of around ten years. Because of the finite lifetime of such a power source, efforts should be made to save battery consumption and prolong its life. In another embodiment, power source 156 is a passive device that derives its energy from wireless transmissions sent to the sensor unit; energy associated with the wireless transmissions is harnessed and stored by power source 156. The preceding examples are only two exemplary possibilities that could be used, as others are certainly possible.

Transceiver unit 138 is one of the vehicle system modules (VSMs) located on vehicle 12 and may be electronically connected to any number of different vehicle electronic modules, such as telematics unit 30, and wirelessly connected to sensor units 130-136. According to an exemplary embodiment, transceiver unit 138 includes an RF transceiver and a signal processing subsystem or module for communicating with sensor units 130-136 over the wireless link mentioned above. Other wireless communication techniques could also be used to facilitate wireless communication between these components. Transceiver unit 138 may be integrated or combined with another device in the vehicle, such as a remote function actuator (RFA) 174, it may be a standalone module, or it may be implemented according to some other arrangement known in the art, for example. RFAs can be used for remote keyless entry (RKE) and vehicle theft deterrent (VTD) systems. It should be appreciated that transceiver unit 138 may include any combination of electronic components and devices known in the art, including an antenna 178, an exemplary communications circuitry 180 having a processing unit 182, a wireless unit 184, and memory 186. Components 182-186 could be similar to those described in conjunction with sensor unit 130, or they could be different in order to accommodate the needs of a vehicle-mounted module. Transceiver unit 138 may also have an I/O device 188 for connecting the transceiver unit to a vehicle bus 44 or other vehicle communications network, as well as other components like a fully integrated voltage controlled oscillator (VCO), an intermediate frequency (IF) filter, a phase-locked loop (PLL) circuit, a demodulator, a loop filter, etc.

Rather than a single transceiver unit 138, TPM system 100 can instead have multiple transceiver units, one located adjacent each wheel to acquire tire pressure readings and the identification number from just the TPM sensor attached to the tire at that location. These transceiver units can communicate either via wires or wirelessly with a central unit connected to the vehicle bus 44, or in some embodiments may each be connected independently to the bus 44. Separate transceivers at each tire location can be used to automatically associate a TPM sensor and its identification number with a particular tire location so that no manual entry or separate electronic tool is needed to make that association of identification numbers and tire locations.

It should be appreciated that the general operation of a TPM system is known in the art. Thus, a recitation of the known general operation is not provided here. TPM system 100 may be used with any number of wheel-mounted sensor units 130-136, and is not limited to use with four sensor units only. For instance, the TPM system could interact with one, two or three sensor units, or it could interact with more than four sensor units, such as the case of a tractor trailer or the like. In some cases, TPM systems use a low frequency wireless signal (e.g., 125 KHz) to program the wheel-mounted sensor units when the vehicle is being manufactured and before it has left the manufacturing facility. This type of communication typically takes place between a piece of electronic equipment at the manufacturing facility and the sensor units.

Method

Figure 4:
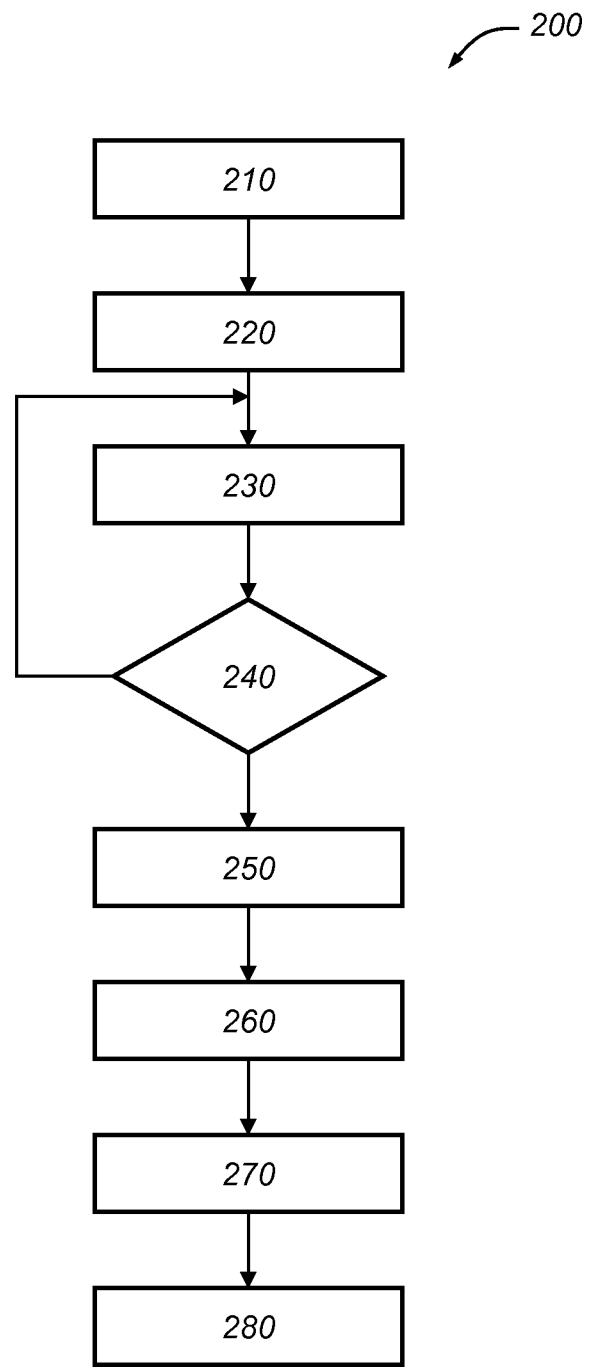
FIG. 4 is a flowchart illustrating some of the steps of an exemplary method of detecting a tire rotation and providing customized services.

Turning now to FIG. 4, there is shown a method 200 that detects a vehicle tire rotation using a vehicle system module such as the telematics unit 30 and/or the TPM system 100. Based on this detected tire rotation, the system 10 can then take some action, such as to provide a customized service to the vehicle owner or other subscriber; for example, by recording the occurrence in a vehicle maintenance log or sending the subscriber an alert that it has occurred, or monitoring mileage and later reminding the subscriber of a subsequent recommended rotation based on the elapsed mileage. In some embodiments, the data gathering and analysis done to determine that a tire rotation has occurred is carried out completely at the vehicle. In other embodiments, at least some of the steps are carried out at a call center using data sent between the vehicle and call center (in either or both directions) via the telematics unit 30. Also, the customized service carried out for the vehicle owner or other subscriber can be carried out at the vehicle or via the call center. For example, the vehicle user can be given a reminder that it is time for another tire rotation (based on elapsed mileage or some other trigger set following a previous detected tire rotation), and this reminder can be given to the user when in the vehicle (e.g., via voice message) and/or via an email from the call center or other central facility. The embodiment primarily described below involves carrying out the tire rotation detection steps in the vehicle using the telematics unit 30 as the central point of storing and processing the needed data, but it will be appreciated that some or all of those steps can be carried out using other vehicle system modules or at the call center 20.

The method starts at step 210 and begins by obtaining the identification numbers and corresponding tire locations for the TPM sensors 130-136. This information can be obtained in a number of different ways; for example, manually via input into the vehicle via a vehicle user interface or using a tool that loads the information in via a wired or wireless connection to the vehicle. In one embodiment, this information is initially obtained during manufacturing of vehicle 12. In this embodiment, four ID numbers along with their corresponding locations (e.g., front right (FR), front left (FL), rear right (RR), rear left (RL)) are obtained, for example, via a manufacturer antenna or a handheld electronic tool or from a database containing each vehicle sensor ID number and corresponding tire location. In another embodiment, telematics unit 30 sends one or more inquiry signals requesting sensors 130-136 ID numbers and/or locations to a VSM 42 such as an engine control module (ECM). In yet another embodiment, telematics unit 30 sends one or more inquiry signals requesting sensors 130-136 ID numbers and/or locations to the transceiver unit 138. Then, this transceiver 138 retrieves the requested information from the sensors 130-136 or from memory 186 and sends a reply back to telematics unit 30 via vehicle bus 44. Skilled artisans should appreciate that other embodiments are also possible. Although the illustrated embodiment uses four TPM sensors, and thus four identification numbers and their corresponding locations, skilled artisans should appreciate that method 200 could easily employ more or less permutations of identification numbers and corresponding locations, including 5 tire sensor ID numbers (e.g., 5 tires rotation, FL, FR, RL, RR, and spare tire), 2 tire sensor ID numbers (e.g., front tire size is different than rear tire size, use only FL and RL ID numbers, use only FR and RR ID numbers), etc.

At step 220, the identification numbers and their corresponding tire locations are stored. The data can be stored inside the vehicle, outside the vehicle (e.g., at the call center 20), and/or both. In one embodiment, the data is stored inside vehicle 12 in a central location such as in TPM system 100 or in another VSM 42, and telematics unit 30 can retrieve the data via communications bus 44. In another embodiment, the data is stored in telematics unit 30 such as telematics memory 54. In a third embodiment, in addition to being stored inside vehicle 12 the data is also stored at call center database 84.

Skilled artisans will recognize other means to store the data. These steps of obtaining and storing the ID numbers and corresponding tire locations can be done during manufacturing, so that the vehicle is then provided to its first customer with the information already stored in the vehicle, or can be done after delivery to the customer, such as periodically based on time or mileage.

Once the TPM sensor identification numbers and associated tire locations are stored, the system can thereafter check to determine if there is a change in the tire locations of any of the TPM sensors. For example, the check might determine if any of the sensors have been replaced or moved to a different tire location, and this can be done either periodically at fixed or varying intervals, or based on some trigger (e.g., in response to a request or scheduled check or occurrence of some event). One or more new sensor IDs might appear, for example, if one or more tires (and their associated TPM sensors) are replaced. In the event of a typical tire rotation process, two or more tires and their TPM sensors will be moved to different tire locations around the vehicle, and this change in tire location can be analyzed to determine that a tire rotation has, in fact, been carried out.

To determine whether a change has occurred, the TPM sensor identification numbers and their corresponding tire locations are again obtained, as shown at step 230. This updated sensor ID and location data may be obtained at a scheduled time or upon a triggering event. In one embodiment, telematics unit 30 periodically sends an inquiry signal to TPM system 100 (e.g., every hour, day, week, month, etc.) to obtain the current TPM sensor identification numbers and their corresponding locations. Such information may be maintained in TPM sensor system 100 and updated by reprogramming of the TPM system 100 each time a tire is replaced or a tire rotation is carried out. For example, a technician that performs a tire rotation may reprogram the vehicle manually or otherwise to identify the sensor IDs and their (new) corresponding tire locations. For some vehicles, this reprogramming allows the vehicle to not only monitor tire pressure in each tire and provide a warning to the driver when an undesired change or absolute pressure occurs, but also to identify on which tire this has occurred. Where such data concerning this sensor ID-tire location correspondence is maintained in the vehicle, it may be made available to telematics unit 30 for comparison to the previously stored sensor ID and tire location data to determine if anything has changed. In other embodiments, the location of each TPM sensor can be determined automatically, and independently of any programming of TPM system 100; for example, by querying a transceiver unit 138 or other module that is located at and unique to each tire location, or by use of a combination of software and hardware such as accelerometers and RF level to determine each TPM sensor unit 130-136 location, or by any other suitable means. In another embodiment, the location associated with each TPM sensor ID can be manually entered, such as by using a tool or via a vehicle user interface. Apart from a time or mileage-based checking of TPM sensor IDs, a triggering event may be used to trigger processor 52 to send an inquiry signal. There are a variety of triggering events that can be used; for example, a programmed (automatic) triggering based on a recent reprogramming of the TPM system with the TPM sensors identification numbers and corresponding locations, a request by a user of vehicle 12, reaching a predetermined absolute mileage (e.g., every 1,000 miles), or a certain mileage following a previous tire rotation, reaching a predetermined date or time interval (e.g., every week or every month or just once following a previous tire rotation), etc.

Once the updated sensor identification numbers and corresponding tire locations are obtained, then at step 240 a check is made to determine if one or more of the wheels 112-118 have changed location. This can be determined by comparing the updated identification numbers and corresponding tire locations with the previously stored ones to determine if there has been a change in the tire locations of one or more of the TPM sensors. In one embodiment, processor 52 of telematics unit 30 compares the current tire location of one or more of the wheels' corresponding TPM sensor identification numbers to the location stored in step 220. In another embodiment, the updated sensor identification numbers and corresponding tire locations are sent to call center 20 via telematics unit 30 and the determination is made there. As noted above, the sensor locations on the vehicle may change due to a tire rotation wherein the TPM sensors are moved along with their associated tire to a different tire location in the vehicle. Or, one or more sensor identification numbers may no longer be present (e.g., sensor unit 130, 132, 134 or 136 is replaced, use of winter tires and corresponding sensor units instead of summer tires, etc.), and method 200 may take into consideration this change. If there are no changes then method 200 loops back to step 230; otherwise, method 200 proceeds to the next step.

If one or more sensor IDs or their locations have changed, then at step 250, method 200 stores the updated identification numbers and corresponding tire locations. This permits them to be used to check for subsequent changes. This step can be implemented as in step 220. Method 200 may keep a history log of all identification numbers and corresponding locations, and this log can be updated each time the sensor IDs and locations are checked, or only when they change. The log can include a timestamp or mileage stamp taken at the time the sensor IDs were checked. The data can be stored inside the vehicle, outside the vehicle, and/or both as described in connection with step 220.

At step 260, method 200 determines that a tire rotation has occurred based on the determined change in tire location(s) associated with one or more sensor ID numbers. Every change in the association of sensor IDs and tire locations need not be considered a tire rotation, but in some embodiments may be. For example, where only a single change is detected, e.g., a single new sensor ID is present, but all others remain the same and in the same tire location, this may indicate that a tire or sensor was replaced, and it may be desirable to not consider this a tire rotation. Thus, for example, the history log could then be updated with this change, but the current upcoming tire rotation reminder could be left intact rather than resetting it as if a tire rotation had occurred. Or, for example, where two new sensors have appeared in the front tire positions of a front wheel drive vehicle, the system may by design treat this as a tire rotation and take corresponding action (log the event, alert the subscriber, set a reminder trigger based on current mileage). In other embodiments, the determination in step 260 compares the determined change with known tire rotation patterns and determines that a tire rotation has occurred if the change matches any of the known patterns. Those skilled in the art will appreciate that there are a variety of tire rotation techniques depending on the tire size (e.g., front tires have different size than rear tires), use of directional tires, vehicle 12 powertrain (e.g., front wheel drive, rear wheel drive, four wheel drive), number of tires rotated (e.g., 4 tire rotation, 5 tire rotation, etc.), tire manufacturer recommendation, etc. Some of the tire rotation techniques include swapping location between FR tire and RR tire and between FL tire and RL tire (e.g., 4 tires of the same size), swapping location between FR tire and FL tire and between RR tire and RL tire (e.g., front tires have different size than rear tires), etc. Other techniques include forward cross (e.g., used for front wheel drive), rearward cross (e.g., used for rear wheel drive), x pattern, 5 tires forward cross (e.g., 4 tires and a full size matching spare), 5 tires rearward cross (e.g., 4 tires and a full size matching spare), and others. In one embodiment, one or more tire rotation techniques can be stored at a location inside the vehicle (e.g., memory 54), outside the vehicle (e.g., database 84), or both. Then, in one embodiment, telematics unit 30 analyzes the data and determines that the change between the stored and updated tire locations for the sensors matches a particular tire rotation pattern; however, in another embodiment, this is done at the call center 20 via transmission of data to the call center. In yet another embodiment, a user of vehicle 12 provides the sensor ID and tire location information via, for example a communication to call center 20, a service website, etc.

At step 270, method 200 records the tire rotation. In one embodiment, memory 54 stores the tire rotation date, tire rotation pattern (e.g., front to rear, side to side, forward cross, rearward cross, etc.), sensor unit 130-136 identification numbers and corresponding locations, etc. In another embodiment, database 84 stores the tire rotation date, tire rotation pattern, etc. In any case, a history log of tire rotations can be stored and available upon request from a call center live advisor 86 or a user of vehicle 12 to list but two examples.

At step 280, method 200 provides one or more customized services to a subscriber or user of the vehicle 12. In one embodiment, telematics unit 30 sends a reminder to a user of vehicle 12 about performing a tire rotation after vehicle 12 is driven for a certain number of miles or after the expiration of a certain time duration. The reminder can be played via audio system 36, displayed via visual display 38, and/or via any other technique. Thus, for example, contemporaneously with recording the occurrence of the tire rotation at step 270, the system can set a trigger either in the vehicle or at the call center to remind the user after another 10,000 miles have elapsed that the tires again need to be rotated, and this trigger can remain set until the reminder is given or it is cleared; for example, due to expiration of the user's telematics services subscription or due to the tires being replaced or rotated before the reminder is triggered. In another embodiment, telematics unit 30 provides a user of vehicle 12 with a history log of vehicle 12 tire rotations upon request. This history log can be obtained via vehicle 12 (e.g., a call to call center 20 via telematics unit 30), via a service website (e.g., a user of vehicle 12 logs in to a service website), or via any other communication means (e.g., mobile phone, email, etc.). The reminder and/or history records can include the prior rotation technique used, and this can be used to automatically identify and recommend the specific rotation order to be used for the next (upcoming) tire rotation. Similarly, if it is determined (e.g., via the detection of two or more new sensor IDs) that at least some of the vehicle tires have been replaced, then the system could adjust its recommendation of the next tire rotation order to account for that fact. Information regarding the tire rotation history may also be used to facilitate or improve predictive algorithms such as for determining expected tire life. This can be done using aggregated data from many vehicles using techniques that are known to those skilled in the art.

The system and method discussed above may also be used in some embodiments to assist the vehicle user in determining that the technician performing the tire rotation either did not follow the recommended rotation pattern or did not reset the system following the rotation. For example, the telematics unit can be programmed with the proper rotation patterns to be performed either at the proper mileage or following a previous particular tire rotation, and upon receiving the sensor IDs and corresponding tire locations, the telematics unit can determine if the tires were rotated to their correct position. Thus, for example, where the proper rotation is a criss-cross pattern, but the telematics unit, based on the sensor IDs and detected locations, determines that instead the tires were rotated front to back, the telematics unit can provide an alert to the driver in the vehicle or electronically via email or otherwise that the preferred rotation pattern was not used. As another example, where the vehicle is equipped with a reminder system that tracks vehicle mileage since the last tire rotation and then alerts the driver that it is time for the tires to be rotated, if the driver continues to receive these notification following an actual tire rotation that was performed, then this indicates that the reminder system was not reset when the tire rotation was carried out and that it needs to be reset now. This can be provided to the driver along with a prompt via the vehicle user interface to query whether the driver would like the system to be reset and, upon receiving a verbal or other confirmation from the driver, can automatically then carry out this reset. At least some of these functions can be carried out using hardware and software components other than in the telematics unit, such as using other modules on the vehicle, or at the call center.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of detecting a vehicle tire rotation using a vehicle system module, comprising the steps of:
   (a) obtaining identification numbers and corresponding tire locations for a plurality of tire pressure monitoring (TPM) sensors attached to tires of a vehicle;
   (b) storing the identification number and corresponding tire location for each of the TPM sensors;
   (c) determining a change in the tire locations of at least one of the TPM sensors using at least one vehicle system module located onboard the vehicle; and
   (d) determining that a tire rotation has occurred based on the change.

2. The method of claim 1, wherein step (a) further comprises providing the vehicle with a telematics unit, the vehicle having inflated tires and a tire pressure monitoring (TPM) system that includes the TPM sensors each of which is located on a different one of the tires, wherein the tires and their associated TPM sensors are each located at one of a number of tire locations around the vehicle and wherein the telematics unit is interconnected with the TPM system such that it receives the identification numbers for the TPM sensors from the TPM system.

3. The method of claim 1, wherein step (a) further comprises automatically obtaining the corresponding tire locations for each of the TPM sensors.

4. The method of claim 1, wherein step (a) further comprises receiving the corresponding tire locations for each of the TPM sensors from a manual input to the vehicle.

5. The method of claim 1, wherein steps (b) through (d) are carried out in the vehicle.

6. The method of claim 1, wherein the at least one vehicle system module comprises a TPM system that includes the TPM sensors.

7. The method of claim 1, wherein the at least one vehicle system module comprises a telematics unit and wherein at least one of steps (b) through (d) are carried out using data sent between the vehicle and a call center via the telematics unit.

8. The method of claim 1, wherein step (c) further comprises, after step (b), the steps of obtaining updated identification numbers and corresponding tire locations for at least some of the TPM sensors, comparing the updated identification numbers and corresponding tire locations with the stored identification numbers and corresponding tire locations, and determining the change based on the comparison.

9. The method of claim 1, wherein step (c) further comprises automatically determining that there was a recent TPM system reprogramming.

10. The method of claim 1, wherein step (d) further comprises determining that at least two of the TPM sensors have changed tire locations.

11. The method of claim 1, further comprising the step of recording the tire rotation and subsequently providing a subscriber with a reminder to rotate the tires based on time or mileage elapsed since the tire rotation.

12. A method of detecting and responding to a vehicle tire rotation using a vehicle telematics unit, comprising the steps of:
  (a) obtaining identification numbers and corresponding tire locations for a plurality of tire pressure monitoring (TPM) sensors installed on a vehicle;
  (b) storing the identification numbers and their corresponding tire locations;
  (c) obtaining updated identification numbers and their corresponding tire locations for the TPM sensors following a reprogramming of a TPM system located on the vehicle;
  (d) comparing the updated and stored locations for the TPM sensors; and
  (e) if one or more of the TPM sensors has changed tire locations, then:
    (e1) determining that a tire rotation has occurred based on the change;
    (e2) recording the tire rotation; and
    (e3) providing a user of the vehicle with a customized service that is based on the tire rotation;
  wherein at least one of the foregoing steps is carried out using a vehicle telematics unit.

13. The method of claim 12, wherein step (c) comprises obtaining the updated identification numbers and their corresponding tire locations at the telematics unit following reprogramming of the TPM system with the updated identification numbers and their corresponding tire locations.

14. The method of claim 12, wherein step (c) comprises obtaining the updated identification numbers and their corresponding tire locations following a manual reprogramming of the TPM system.

15. The method of claim 12, wherein step (e1) further comprises determining that a tire rotation has occurred by comparing the change in location(s) with a stored tire rotation pattern.

16. The method of claim 12, wherein step (e2) comprises obtaining the vehicle mileage and storing a record of a tire rotation and vehicle mileage at a vehicle electronic storage module, a call center, or both.

17. The method of claim 16, wherein step (e3) comprises sending a reminder to a vehicle user about performing another rotation of the tires after the vehicle is driven for a certain number of miles following the tire rotation.

18. The method of claim 16, wherein step (e3) comprises providing the user with a vehicle service history that includes the tire rotation and associated vehicle mileage.

19. The method of claim 12, wherein at least steps (b) through (e1) are carried out at the vehicle.

20. A vehicle that detects tire rotations performed on the vehicle, comprising a vehicle having inflated tires and a tire pressure monitoring (TPM) system that includes a plurality of TPM sensors each of which is located on a different one of the tires, wherein the tires and their associated TPM sensors are each located at one of a number of tire locations around the vehicle, and wherein the vehicle is programmed to carry out the following steps:
  (a) obtaining identification numbers and corresponding tire locations for the TPM sensors;
  (b) storing the identification number and corresponding tire locations;
  (c) determining a change in the tire locations of at least one of the TPM sensors; and
  (d) determining that a tire rotation has occurred based on the change.

* * * * *